Jan. 17, 1967     D. T. BARISH     3,298,635
SELF-INFLATING WINGS
Filed March 3, 1964     3 Sheets-Sheet 1
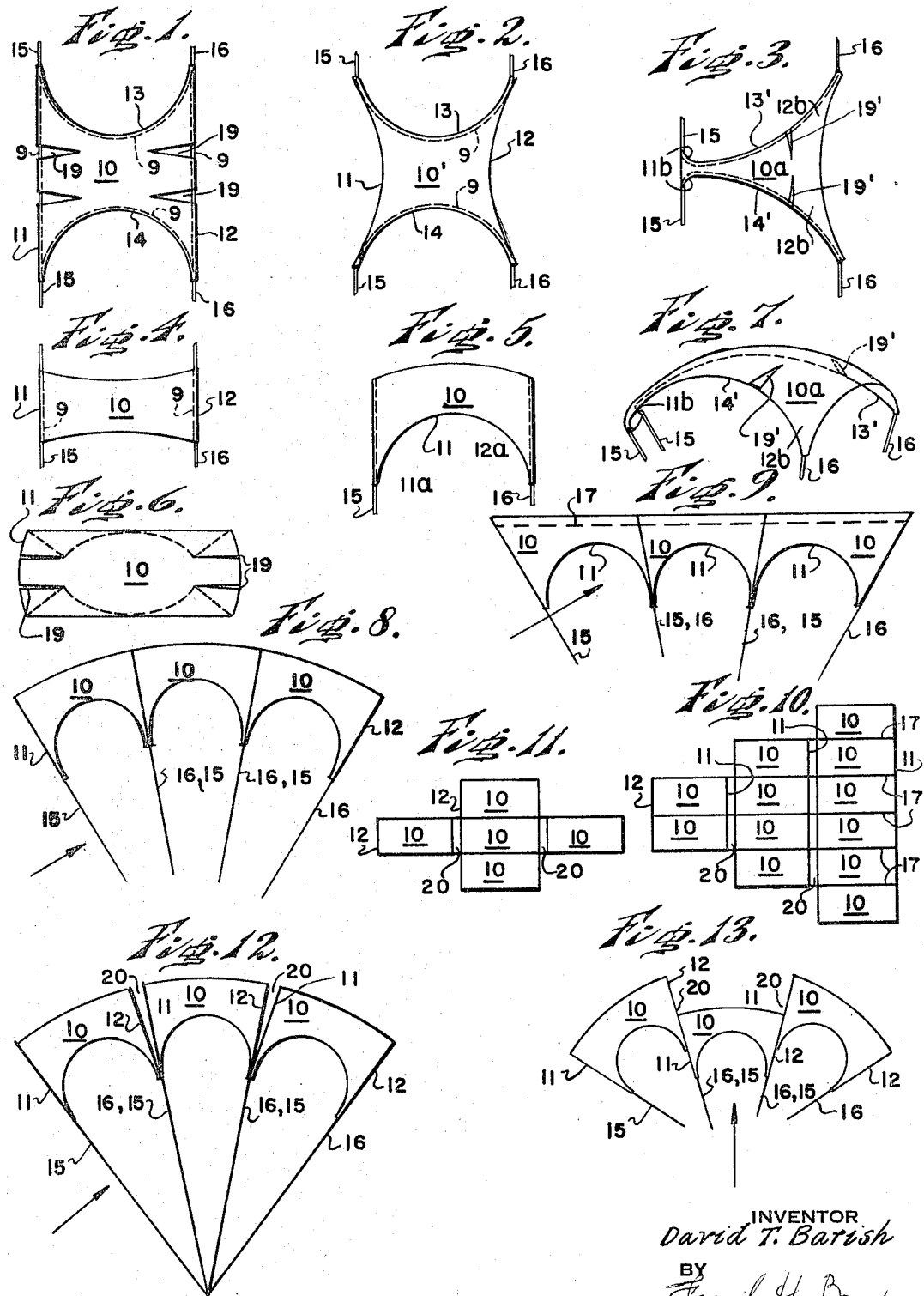
INVENTOR
David T. Barish
BY
Frank H. Borden
ATTORNEY Jan. 17, 1967 D. T. BARISH 3,298,635
SELF-INFLATING WINGS
Filed March 3, 1964 3 Sheets-Sheet 2

INVENTOR.
DAVID T. BARISH
BY
ATTORNEY

Jan. 17, 1967  D. T. BARISH  3,298,635
SELF-INFLATING WINGS

Filed March 3, 1964  3 Sheets-Sheet 3

INVENTOR.
DAVID T. BARISH
BY Frank H. Borden
ATTORNEY

United States Patent Office

3,298,635
Patented Jan. 17, 1967

3,298,635
SELF-INFLATING WINGS
David T. Barish, 224 E. 38th St., New York, N.Y. 10016
Filed Mar. 3, 1964, Ser. No. 349,053
9 Claims. (Cl. 244—35)

This invention relates to self-inflating wings or wing modules, pertaining particularly to such wings as comprise parachutes, kites and gliders. One, purely illustrative exemplification of its use, is in missile recovery systems and the like.

The invention is carried out basically with a wing module of special design, of useful significance of itself, but which is preferably used in pluralities to establish a total lifting surface of a wing organization. The wing modules, which may be of various shapes and contours, as will be explained, are preferably used in pluralities, either in connected lateral or chordwise juxtaposed relation, or in spanwise alignment or in streamwise cascade, usually, but not essentially, with two or more of the modules also in lateral or chordwise connected juxtaposed relation.

An important advantage of the invention is that the wings have stowability, in a small compass, are of relatively light weight, and are self-inflating upon deployment.

It is among the other objects of the invention: to provide a wing which is self-inflating without bending structures; to provide a wing which does not require spars; to provide a wing using catenaries for transmission of lift loads; to provide a wing formed of a module involving spars in compression only, to improve the glide performance; to provide a wing usable as a glider with a glide ratio superior to that of other parachutes; to provide a wing module formed of initially flat sections two opposite edges of which are concave; to provide a wing module of a section two opposite edges of which are concave in opposite directions and shaped as catenary curves; to provide a wing module to opposite sides of which suspension lines are attached in catenary curved relation; to provide a wing formed of initially flat sections, the edges of which are initially or ultimately concave chordwisely or spanwisely; to provide a wing module which in plan under inflation is selectively generally rectangular or in which the chordwisely spaced edges are either convex or concave; to provide a wing module in which spanwisely the edges are shaped as concave catenary curves, and in which the chordwise edges are selectively parallel linear edges, or, and preferably, they are outwardly concave, either by pre-shaping, or by the provision of gathers, plaits or darts in the initially formed chordwise edges, to establish selectively minimal or appreciable spanwise camber in the module under inflation; to provide a wing module in which the chordwise camber is less than the spanwise camber under inflation; to provide wing modules having the following characteristics: (a) wing side convergent, (b) allows chordwise camber of the wing, (c) minimizes the effects of elasticity, (d) decrease of canopy spanwise tension, (e) lower camber due to loading, (f) allows spanwise curvature of the wing, (g) in limit as spanwise curvature equals zero so all loads are carried by spanwise members and as chordwise curvature equals zero all loads are carried by chordwise members, (h) effects due to spanwise edge elasticity are localized, (i) permits spanwise changes in section incidence; and many other objects and advantages will become more apparent as the description proceeds.

In the accompanying drawings, forming part of this description:

FIG. 1 represents a plan of an illustrative form of module in its initial form, in which darts or the like are provided in the leading and trailing chordwise edges, while the lateral spanwisely extending edges are concavely shaped on catenary curves.

FIG. 2 represents a plan of another illustrative form of wing module as formed prior to inflation.

FIG. 3 represents a plan of another illustrative wing module as formed prior to inflation, having leading and trailing edge darts, and which is of generally triangular shape.

FIG. 4 represents a generally schematic plan of the wing module of FIG. 1, without darts, under inflation.

FIG. 5 represents a side elevation of the wing module of FIG. 4 in a schematic view, under inflation.

FIG. 6 represents a schematic plan of the wing module of FIG. 1, with its darts, and of FIG. 2, under inflation.

FIG. 7 represents a side elevation of the roughly triangular form of the wing module shown in FIG. 3, under inflation.

FIG. 8 represents a side elevation of a plurality of chordwisely connected wing modules of the species shown in FIGS. 1 and 2, without spars.

FIG. 9 represents a side elevation of a plurality of chordwisely connected wing modules, according to FIGS. 1 and 2, with a common spar extending across the plural modules.

FIG. 10 represents a plan of a plurality of the wing modules of FIG. 1 or FIG. 2, in an operative complete useful organization thereof.

FIG. 11 represents a plan for a plurality of wing modules in another organization for efficient use thereof.

FIG. 12 represents a side elevation of the organization of FIG. 11, functioning, primarily, as a glider.

FIG. 13 represents a side elevation of the organization of FIG. 11, as coupled for primary functioning as a parachute.

Figure 14:
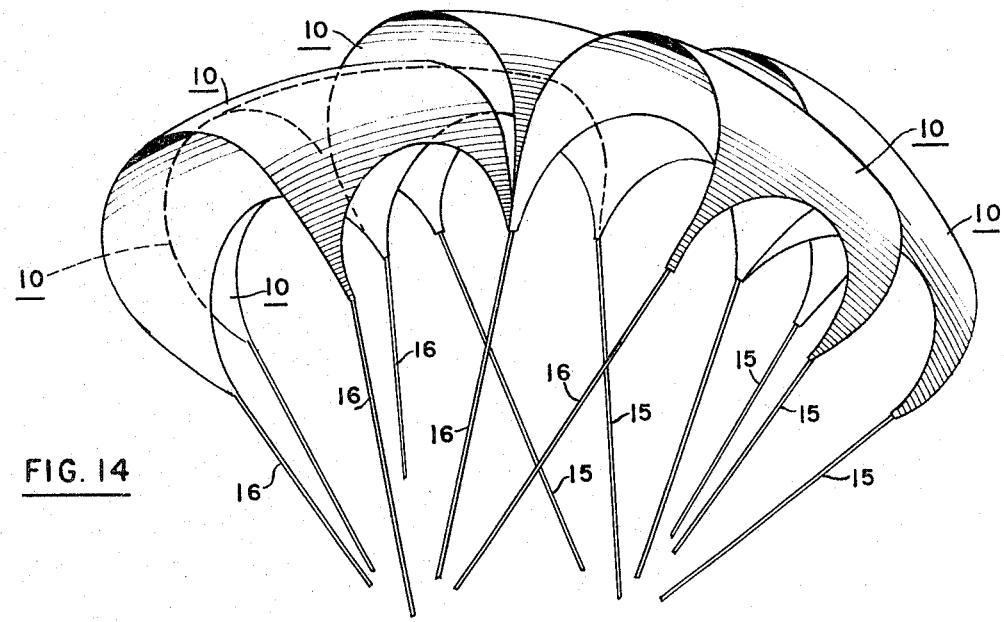
FIG. 14 represents a schematic perspective of a plurality of wing modules in relative arrangement, functioning primarily as a glider.

The most basic feature of the invention is the provision of a wing, flexible in at least one direction, sides of which are connected to catenaries to take the lift loads.

In the simplest exemplification of the invention the wing formed of a module or plurality of modules is flexible in two directions and has no spars. Secondarily, when required or desired, the wing module is flexible in one direction and has a spar or spars used primarily in compression. The wing modules of adequate area may be used alone, or, and preferably, they are arranged in multiples having desired predetermined flight characteristics, according to whether the assembly is designed primarily to function as a glider or as a parachute.

The basic module, in one form, is shown at 10, in plan in FIG. 1, and like all of the modifications thereof, as presently envisioned, comprises a sheet, or plural juxtaposed sheets, of light weight, thin, substantially air-imprevious, flexible material, without more than minimal bending resistance in both directions so as to be bendable, or even crumpable for stowage and easy deployment, cut out to outline the instant module. As shown in FIGS. 1 and 2, the modules, respectively 10 and 10' are initially generally rectangular in planform, under inflation, and as outlined provide leading edge 11 and trailing edge 12, in general parallelism. The extremities of these edges are connected by respective spaced catenary curved spanwise edges 13 and 14.

As indicated in FIG. 1 the respective leading and trailing edges 11 and 12 may be parallel generally linear edges. While this provides a thoroughly useful organization, it is preferred to form in one or both edges a dart or a plurality of darts or gathers 19. These shape and contour the module with resultant beneficial enhanced camber effects. As shown in FIG. 1 the darts are shown as initially shaped openings into the section prior to stitching into seams.

In another form of the module shown in FIG. 2, the respective leading and trailing edges 11 and 12 of the section 10′ are pre-shaped as outwardly concave edges. Alternately they may be shaped as outwardly convex edges.

In FIGS. 1 and 2 the oppositely facing catenary curved edges have their effective central radii in substantial coincidence. In deployment under load this effects substantially imporous chordwisely extending symmetrical catenary curtains in spanwise spacing, each having a leading edge area 11a and a trailing edge area 12a.

In the generally triangular form of the module of the invention indicated at 10a in FIGS. 3 and 7, the catenary curved edges 13′ and 14′ containing darts 19′ have their effective central radii in angular divergence. This effects a narrow outboard area 11b and a wide inboard curtain area 12b wider than area 11b. In deployment under load this organization effects substantially imporous catenary curtains, each having a small outboard area 11b and a larger inboard edge area 12b.

In carrying out the invention using the planforms discussed, reinforcing flexible catenary lines 9 are preferably attached to the catenary edges of the respective modules, which are attached to or merge into the important suspension lines attached to and throughout the catenary curved spanwisely extending edges 13 and 14, and 13′ and 14′, and continuing downwardly from the module as leading edge suspension lines 15 and trailing edge suspension lines 16.

It will be observed that the modules between the leading and trailing edges present spanwise areas developing relatively low camber in the streamwise direction under load, whereas the catenary curved edges are of relatively high camber under load, and all loads are carried by suspension lines 15 and 16.

In conformity with complete stowability, the modules prior to inflation, being flexible in all directions throughout their respective areas can be closely packed in suitable envelopes or the like for deployment when desired. The relative wind causes the inflation of the module. Of course, for kites and related purposes such stowage may not be necessary.

While as noted each module has desirable utility of itself for functioning as a wing, there are certain advantages to the use of a plurality of modules in a unitary organization. In effecting such composite assembly, a plurality of modules may be juxtaposed laterally, with the respective catenary corded curved edges in connected relation, either throughout their curved extent, as indicated in FIG. 8, or at the respective suspension lines, as indicated in FIG. 12. The difference is that with the complete attachment of FIG. 8 the air cannot flow upwardly between contiguous modules, whereas, with attachment only at or adjacent to the respective suspension lines, shaping of the modules can be a function of relative wind flow. While such connection between modules is within the contemplation of the invention, it is preferred to effect a combination of plural laterally connected modules and at least one streamwisely disposed module.

In FIG. 8 an illustrative three modules are connected together and shown in inflation by the relative wind, the general direction of which is indicated by the arrow.

In the description so far the modules have been considered as flexible in both directions without spars.

In FIG. 9 the modules connected together at or by the respective suspension lines are shown in inflation by the relative wind, the general direction of which is indicated by the arrow. In this figure the illustrative three connected modules of FIG. 8 are rigidified chordwisely by a common spar 17 engaging all of the modules. As indicated in FIG. 9, the mergence of one side of a module with the side of a contiguous module forms a chordwisely extending groove in each module in axial alignment in which aligned grooves integral spars 17 are anchored.

The spars 17 are subjected primarily to compressive rather than bending strains. They may therefore be quite light in weight and slender in diameter. An illustrative form of spar 17 is comprised of a thin tube of fiberglass or the like. Other materials may be used. The spars may take the form of light weight flexible tubes, inflated by the relative wind, or from an internal air supply. The use of compression spars on the chords, by breaking chordwise into modules, lowers the compression required since the suspension lines convergence angle of each module is lower and since tension on each riser or suspension line is decreased. It allows lower convergent angles of the risers. The use of spars with wing modules usually attains a higher glide performance.

Although there are many ways of associating plural modules in a group or assembly, and all such are to be construed as within the purview of the invention, it is presently preferred to provide at least three modules in lateral juxtaposition, with at least one module in front or one behind, in symmetry, as diagrammatically indicated in FIG. 11. While the three intermediate modules may have the catenaries connected to common risers or suspension lines, or the catenary edges may be laterally secured together, the risers or suspension lines for the catenaries of front and rear respective modules may be separate in extending to the load, or to a common point, such as a swivel, spaced from the load. By proportioning the lengths of the respective risers or suspension lines 15 and 16 for the front and rear modules, the wing can be predeterminedly organized so that the leading edge 11 of the rear module is substantially juxtaposed to the trailing edge 12 of the central module of the three central modules, and relatedly the trailing edge 12 of the front module is juxtaposed to the leading edge 11 of the center module. This is diagrammatically illustrated in FIG. 12. FIG. 13 shows the effect of a change in the rigging. In this case the inflation of the wing and the assumption of the spanwise camber of each module and the overall spanwise camber of the group, the front and rear modules, being connected to the central modules only at the suspension lines, can separate, widening vents 20. With the relative wind generally vertical as indicated by the arrow in this figure, the wing functions, primarily, as a parachute, with a high drag ratio.

Figure 15:
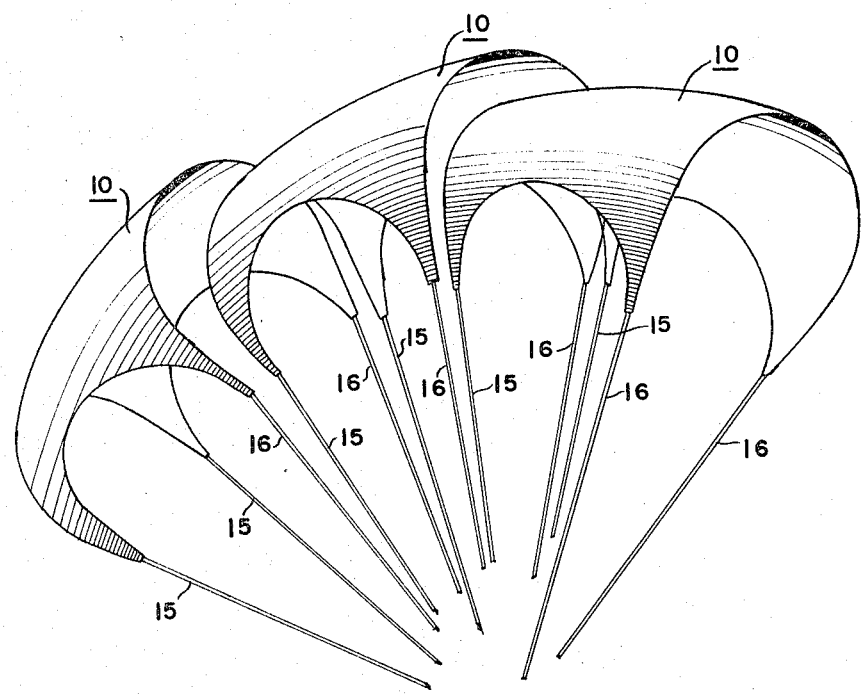
FIG. 15 represents a schematic perspective of a wing module organization, with the wing modules in cascade, and functioning primarily as a glider.
Figure 16:
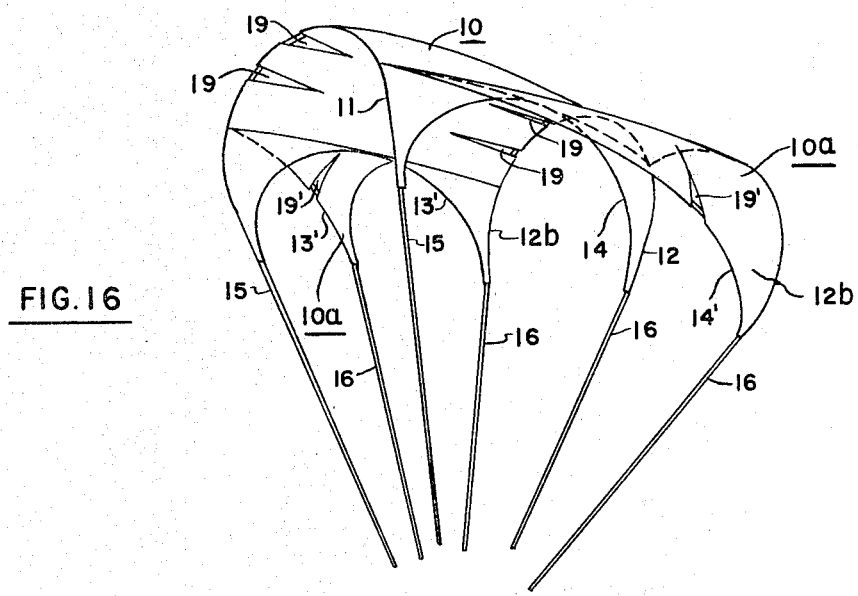
FIG. 16 represents in schematic perspective, an organization of a plurality of the wing modules, in a composite assembly, functioning primarily, as a glider.
Figure 17:
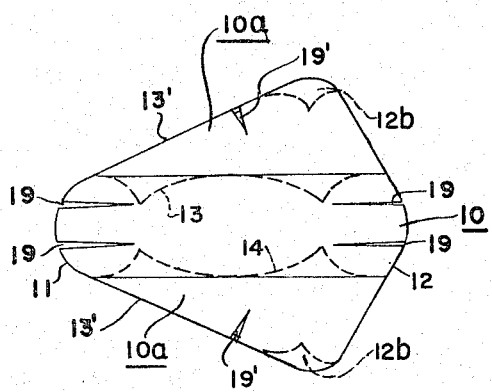
FIG. 17 represents a plan of the assembly of FIG. 16.
Figure 18:
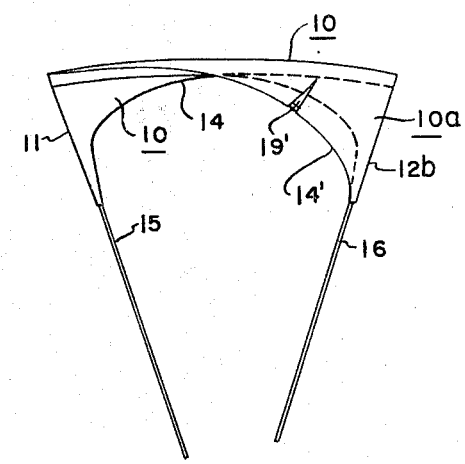
FIG. 18 represents a side elevation thereof.

On the other hand, as an important feature of the invention, the relative adjustments of the risers for the front and rear modules, can effect a cascade effect as shown diagrammatically in FIGS. 14 and 15. In this instance the length adjustments of the respective risers or suspension lines, connected to the catenaries of the respective modules relatively elevates the trailing edge 12 of the front module with respect to the leading edge 11 of the central module. Also the leading edge of the rear module is lowered beneath the trailing edge 12 of the central module. Alternatively the leading edge 11 of the rear module can be elevated relative to the trailing edge 12 of the central module, in a modified cascade effect. This has been found to be quite satisfactory. The oganization in cascade functions as a glider, and tests have indicated satisfactory glide ratios.

As one modification of the basic module, reference is made to FIGS. 3, 7, 16, 17 and 18. The several modules 10a of FIG. 3 can be laterally, or otherwise juxtaposed with the rectangular forms 10, and secured, to form a composite dart type of glider. This differs from previous dart attempts in the fact that the lift loads are carried by catenaries, among other significant differences.

Of course the dimensions of the specific wing modules may vary widely in area and proportions.

The desirable features of the invention will be evident, especially in the recovery of missiles or parts thereof, as the wing can be stowed after compression into a small compass, is relatively light in weight, deploys readily and inflates without anything more than conventional deployment, is stable, extremely economical to fabricate or manipulate, and functions efficiently either as a parachute, a kite or a glider, as desired.

I claim as my invention:

1. A wing comprising a sheet of flexible material having a leading edge, a trailing edge and lateral sides, and catenary shaped lines continuously connected along said lateral sides, said lines extending therefrom and adapted to support a load, said leading and trailing edges being free of catenary line support attached along substantially all of said leading and trailing edges.

2. A wing as claimed in claim 1, wherein said lines extending therefrom are suspension lines.

3. A wing as claimed in claim 1, comprising a multiplicity of wing sections, the lateral sides of each having catenary lines connected therealong.

4. A wing as claimed in claim 1, wherein said flexible material has a leading edge, a trailing edge and non-parallel lateral sides.

5. A wing as claimed in claim 4, wherein said lateral sides are disposed obliquely with respect to said leading edge.

6. A wing as claimed in claim 5, wherein said lateral sides have a portion exposed to airflow about both surfaces of the fabric forming said portion.

7. A wing as claimed in claim 1, wherein said catenary is connected at a multiplicity of points along said lateral sides.

8. A wing as claimed in claim 1, wherein said sheet of flexible material is composed of a multiplicity of chordwisely disposed panels.

9. A wing as claimed in claim 3, wherein at least some of said catenary lines are attached to said flexible material along a chord thereof.

References Cited by the Examiner

UNITED STATES PATENTS

| | | | |
|---|---|---|---|
| 2,536,777 | 1/1951 | Smith | 244—142 |
| 2,959,385 | 11/1960 | Buhler | 244—145 |
| 3,073,555 | 1/1963 | Barish | 244—145 |
| 3,131,894 | 5/1964 | Jalbert | 244—145 |
| 3,188,020 | 6/1965 | Nielsen et al. | 244—145 |
| 3,194,514 | 7/1965 | Rogallo | |

MILTON BUCHLER, *Primary Examiner.*

B. BELKIN, *Assistant Examiner.*